Feb. 16, 1926.　　　　　　　　　　　　　　1,573,448
L. H. PURNELL
METHOD OF MAKING PIPE ELBOWS
Filed Dec. 5, 1924　　　2 Sheets-Sheet 1
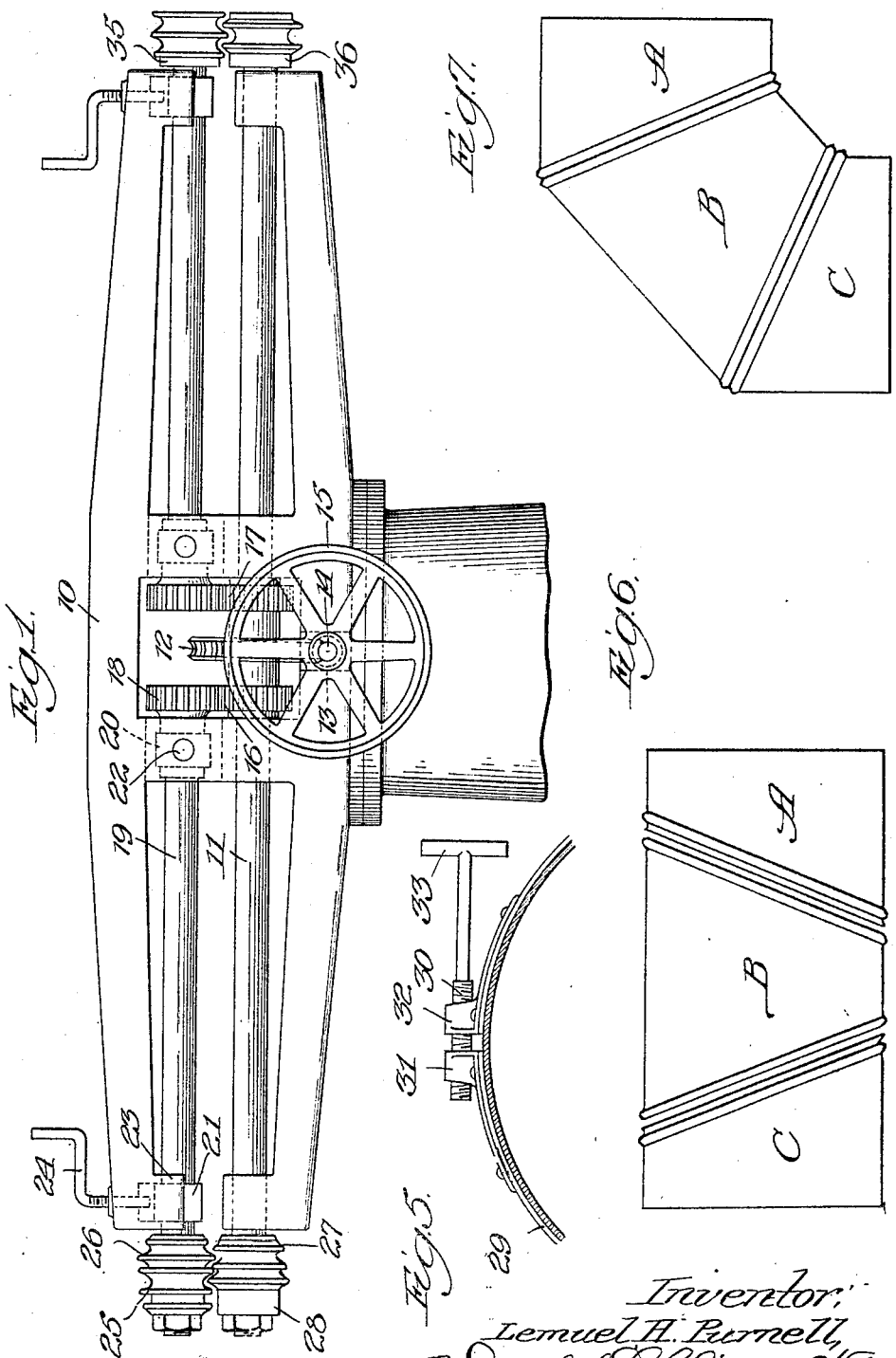

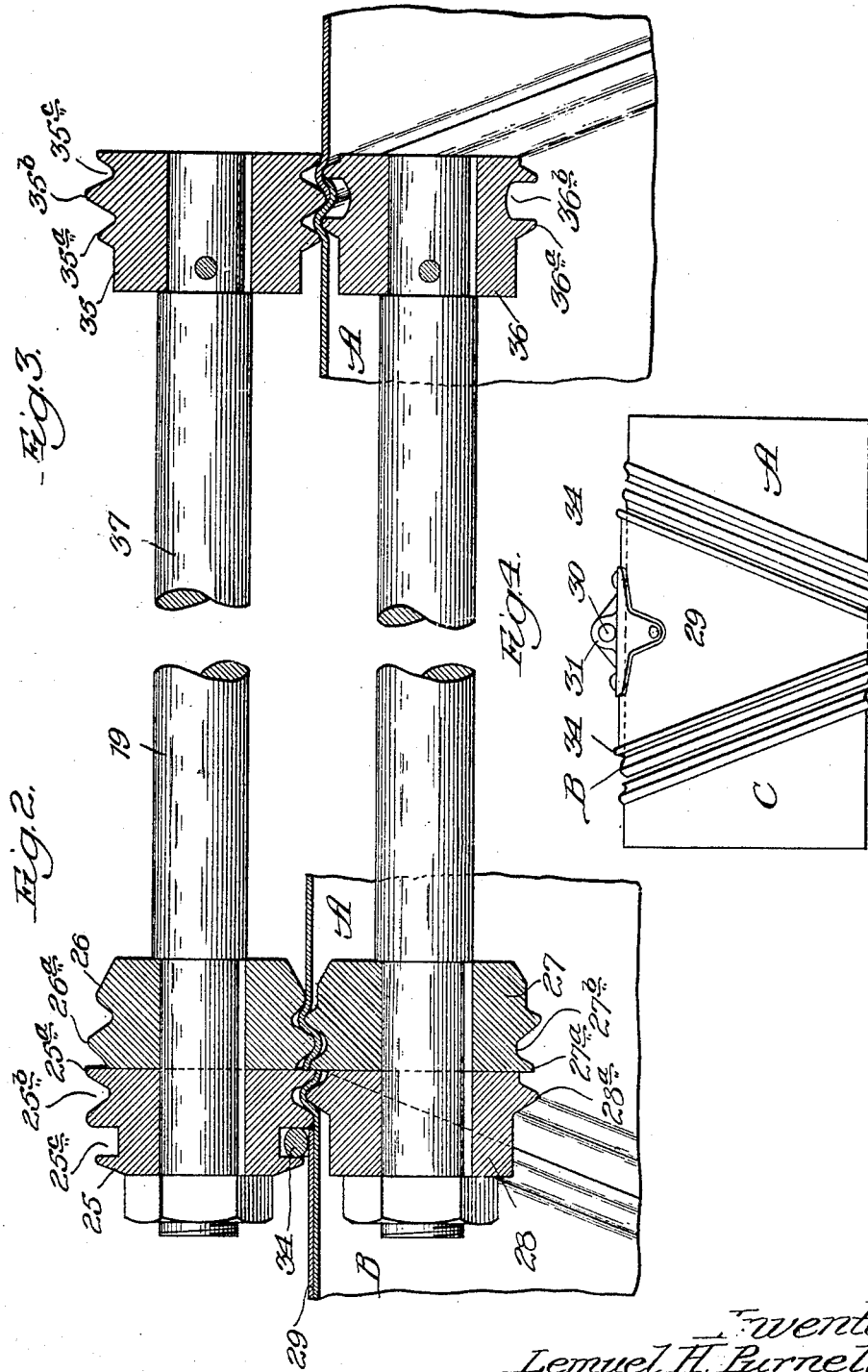

Patented Feb. 16, 1926.

1,573,448

UNITED STATES PATENT OFFICE.

LEMUEL H. PURNELL, OF OAK PARK, ILLINOIS, ASSIGNOR OF ONE-HALF TO HENRY G. GOELITZ AND ONE-HALF TO ENOCH PURNELL.

METHOD OF MAKING PIPE ELBOWS.

Application filed December 5, 1924. Serial No. 754,172.

*To all whom it may concern:*

Be it known that I, LEMUEL H. PURNELL, a citizen of the United States, residing at 826 North Boulevard, village of Oak Park, in the county of Cook and State of Illinois, have invented new and useful Methods of Making Pipe Elbows, of which the following is a specification.

This invention relates to methods of making pipe elbows and the like, and is fully described in the following specification and shown in the accompanying drawings, in which—

Figure 1 is a front elevation of a machine embodying the invention;

Figure 2 is an enlarged vertical section through the rotary cutters showing a pipe in the process of being cut;

Figure 3 is a vertical section through the closing rollers showing two sections of pipe being rolled together;

Figure 4 is a side elevation of a section of pipe showing the templet in place, and one of the pipe elbow sections having been cut off;

Figure 5 is an enlarged detail of the device for clamping the templet about the pipe;

Figure 6 is a side elevation of four sections of a pipe elbow cut by this machine; and Figure 7 is a side elevation of these same sections assembled and turned so as to form a pipe elbow.

This application is a continuation in part of my application Serial No. 597,873, filed October 30, 1922.

The embodiment of the machine for carrying out this invention comprises a frame 10 of double C-type in which a shaft 11 is suitably journaled. A worm wheel 12 is keyed on this shaft and is driven by a worm 13 which in turn is keyed on the shaft 14 which is driven by a pulley 15 from any suitable source of power.

The shaft 11 has keyed thereon spur-gears 16 and 17. The gear 16 meshes with a gear 18 keyed on the shaft 19 which is carried in bearings 20 and 21. The bearing 20 is preferably mounted to rotate about trunnions 22 while the bearing 21 is movable up and down in suitable guideways 23 by means of the threaded crank 24.

The shafts 11 and 19 have keyed thereon rotary cutters which are accurately held against longitudinal movement on the shaft, as shown in detail in Fig. 2. The upper cutter consists preferably of two sections 25 and 26, the former having a cutting edge 25ª which passes a similar cutting edge 27ª on the lower cutter 27 so that a sheet of metal placed therebetween will be cut into two sections A and B as shown in Fig. 2. A groove 27ᵇ is formed in the cutter 27 and a corresponding annular flange 26ª is formed upon the cutting member 26 so as to form the ogee curve in the section A as shown in Fig. 2. A similar groove 25ᵇ is formed in the member 25 and a similar flange 28ª is formed on the member 28 so as to form a reverse ogee curve in the section B.

In order to make elbow sections which can be assembled as will later be explained it is necessary that the cuts between the sections A, B and C shall each lie in a single plane. In order to accomplish this, a templet or jig 29 is clamped about the pipe by means of a right and left hand screw 30 passing through threaded lugs 31 and 32 secured to the ends of the jig and having a handle 33. By turning this screw in one direction it draws the two ends of the templet tightly about the pipe. A round wire bead 34 is secured by welding or brazing to the body of the templet 29 and this engages a groove 25ᶜ in the member 25. It will thus be seen that as the cutters are rotated after having been properly adjusted by means of the screw 24, they will be guided about the pipe by the bead 34 and the groove 25ᶜ so as to make the first cut separating the sections A and B. The last cut is then made by raising the shaft 19 so as to permit the end A and the jig to be removed, reversing the jig so as to bring the opposite end bead between the cutters, lowering the shaft 19, when the rotation of the cutters will sever the section C in the same way. It will be understood of course that by properly choosing the angles of the beads 34, and properly spacing them about the pipe, elbows of four, five or more sections may be made.

When the cuts are thus made it will be found that the outwardly turned edge of the member A can be inserted within the inwardly turned edge of the member B as shown in Fig. 3 by inserting one side first and rocking the other side into position about the first edge as a hinge. For some classes of work this will be sufficient to hold the parts together. In assembling them they are assembled in the same general position as that shown in Fig. 6. In order to make an elbow of them each section is then turned 180 degrees with respect to the next adjacent section with the result shown in Fig. 7.

For other classes of work however it has been found necessary to further crimp or roll the engaging edges so as to increase the grip of each upon the other. For this purpose additional closing rollers 35 and 36 are keyed upon the shafts 11 and 37. The shaft 37 corresponds to the shaft 19 and is mounted and turned in a similar manner. Flanges 36$^a$ and 36$^b$ on the roller 36 are placed in staggered relation with the flanges 35$^a$ and 35$^b$ on the roller 35$^c$ and are spaced so as to engage the edges formed on the sections A and B so as to fold the inturned edge of the section B inwardly and the outwardly turned edge of section A outwardly, thereby increasing the depth of the flanges for more firmly securing these sections together.

The other sections are assembled and if desired closed in the same manner and the pipe elbow finished by rotating the sections as previously explained.

If desired the elbows may be closed in the bent or elbow position, particularly where the number of sections is four or more. The outer ends of the closing rolls 35 and 36 are cut off close to the flanges 35$^c$ and 36$^b$ to permit the elbow sections to pass when so closed.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. The method of making pipe elbows consisting of cutting a straight piece of pipe along a series of alternately inclined planes, simultaneously forming complementary flanges on the cut edges so that one flange will fit within the other, and rotating each section 180° with respect to the contiguous section.

2. The method of making pipe elbows consisting of cutting a straight piece of pipe along a series of alternately inclined planes, simultaneously forming complementary flanges on the cut edges so that one flange will fit within the other, and rotating each section 180° with respect to the contiguous section.

3. The method of making pipe elbows or bends from straight lengths of pipe consisting of cutting said pipe into sections on a series of planes set at an angle less than 90° to the longitudinal axis of the pipe, and reassembling said sections and securing them together with said sections turned with respect to each other about their axes.

4. The method of making pipe elbows consisting of cutting a straight piece of pipe along a series of alternately inclined planes, simultaneously forming complementary flanges on the cut edges so that one flange will fit within the other, placing one flange within the other, and increasing the depth of said flanges so that they cannot be separated.

LEMUEL H. PURNELL.